US009157022B2

(12) United States Patent
Wood

(10) Patent No.: US 9,157,022 B2
(45) Date of Patent: Oct. 13, 2015

(54) FLUID LOSS CONTROL IN VISCOELASTIC SURFACTANT FRACTURING FLUIDS USING WATER SOLUBLE POLYMERS

(75) Inventor: William Russell Wood, Spring, TX (US)

(73) Assignee: Baker Hughes Incorporated, Houston, TX (US)

(*) Notice: Subject to any disclaimer, the term of this patent is extended or adjusted under 35 U.S.C. 154(b) by 633 days.

(21) Appl. No.: 13/222,412

(22) Filed: Aug. 31, 2011

(65) Prior Publication Data

US 2012/0055676 A1 Mar. 8, 2012

Related U.S. Application Data

(63) Continuation-in-part of application No. 11/863,466, filed on Sep. 28, 2007, now abandoned.

(60) Provisional application No. 60/848,412, filed on Sep. 29, 2006.

(51) Int. Cl.
*C09K 8/68* (2006.01)
*E21B 43/26* (2006.01)
*C09K 8/60* (2006.01)
*C09K 8/88* (2006.01)
*C09K 8/506* (2006.01)

(52) U.S. Cl.
CPC ............. *C09K 8/602* (2013.01); *C09K 8/506* (2013.01); *C09K 8/68* (2013.01); *C09K 8/88* (2013.01); *C09K 2208/30* (2013.01)

(58) Field of Classification Search
None
See application file for complete search history.

(56) References Cited

U.S. PATENT DOCUMENTS

| 4,332,297 | A | | 6/1982 | Sandiford | |
|---|---|---|---|---|---|
| 4,552,217 | A | * | 11/1985 | Wu et al. | 166/270 |
| 4,569,393 | A | * | 2/1986 | Bruning et al. | 166/270 |
| 5,036,919 | A | | 8/1991 | Thomas et al. | |
| 5,233,032 | A | | 8/1993 | Zody et al. | |
| 5,256,651 | A | | 10/1993 | Phelps et al. | |
| 5,322,123 | A | * | 6/1994 | Kohler et al. | 166/295 |
| 5,609,208 | A | * | 3/1997 | Sydansk | 166/295 |
| 5,646,093 | A | | 7/1997 | Dino | |
| 5,658,859 | A | | 8/1997 | Burba, III et al. | |
| 5,720,347 | A | | 2/1998 | Audibert et al. | |
| 5,782,300 | A | * | 7/1998 | James et al. | 166/278 |

(Continued)

FOREIGN PATENT DOCUMENTS

WO 9856497 A1 12/1998
WO WO 9856497 A1 * 12/1998

*Primary Examiner* — John J Figueroa
(74) *Attorney, Agent, or Firm* — Mossman Kumar & Tyler PC

(57) ABSTRACT

Water soluble uncrosslinked polysaccharides may be fluid loss control agents for viscoelastic surfactant (VES) fluids used for stimulation (e.g. fracturing) or well completion in hydrocarbon recovery operations. The VES fluid may further include proppant or gravel, if it is intended for use as a fracturing fluid or a gravel packing fluid, although such uses do not require that the fluid contain proppant or gravel. The water soluble uncrosslinked polysaccharide fluid loss control agents may include, but not be limited to guar gum and derivatives thereof; cellulose and derivatives thereof; propylene glycol alginate; salts (e.g. sodium, potassium, and calcium salts) of iota, kappa, and lambda carrageenan; agar-agar; xanthan gum; and the like; and/or mixtures thereof. The fluid loss control agent may be added to the aqueous viscoelastic treating fluid prior to VES addition, and/or at the same time and/or after the VES is added.

10 Claims, 2 Drawing Sheets

(56) References Cited

U.S. PATENT DOCUMENTS

| | | | |
|---|---|---|---|
| 5,842,519 A * | 12/1998 | Sydansk | 166/295 |
| 5,929,002 A * | 7/1999 | Joyce et al. | 507/211 |
| 5,944,106 A * | 8/1999 | Dalrymple et al. | 166/281 |
| 5,964,295 A | 10/1999 | Brown et al. | |
| 6,227,295 B1 * | 5/2001 | Mitchell et al. | 166/300 |
| 6,257,336 B1 | 7/2001 | Audibert et al. | |
| 6,283,212 B1 | 9/2001 | Hinkel et al. | |
| 6,387,853 B1 | 5/2002 | Dawson et al. | |
| 6,605,570 B2 * | 8/2003 | Miller et al. | 507/211 |
| 6,617,285 B2 | 9/2003 | Crews | |
| 6,706,769 B2 | 3/2004 | Crews | |
| 6,742,590 B1 | 6/2004 | Nguyen | |
| 6,756,345 B2 | 6/2004 | Pakulski et al. | |
| 6,776,235 B1 | 8/2004 | England | |
| 6,828,280 B2 | 12/2004 | England et al. | |
| 6,938,693 B2 * | 9/2005 | Boney et al. | 166/280.1 |
| 7,066,260 B2 | 6/2006 | Sullivan et al. | |
| 7,084,093 B2 | 8/2006 | Crews | |
| 7,199,084 B2 | 4/2007 | Parris et al. | |
| 7,355,039 B2 | 4/2008 | Rinaldi et al. | |
| 2002/0019318 A1 | 2/2002 | Harris | |
| 2003/0054962 A1 | 3/2003 | England et al. | |
| 2003/0221592 A1 | 12/2003 | Sironi et al. | |
| 2004/0127367 A1 | 7/2004 | Crews | |
| 2004/0157937 A1 | 8/2004 | Crews | |
| 2006/0205605 A1 | 9/2006 | Dessinges et al. | |
| 2007/0062703 A1 * | 3/2007 | Walters et al. | 166/300 |
| 2007/0125536 A1 | 6/2007 | Acock et al. | |
| 2008/0161209 A1 | 7/2008 | Wood | |

* cited by examiner

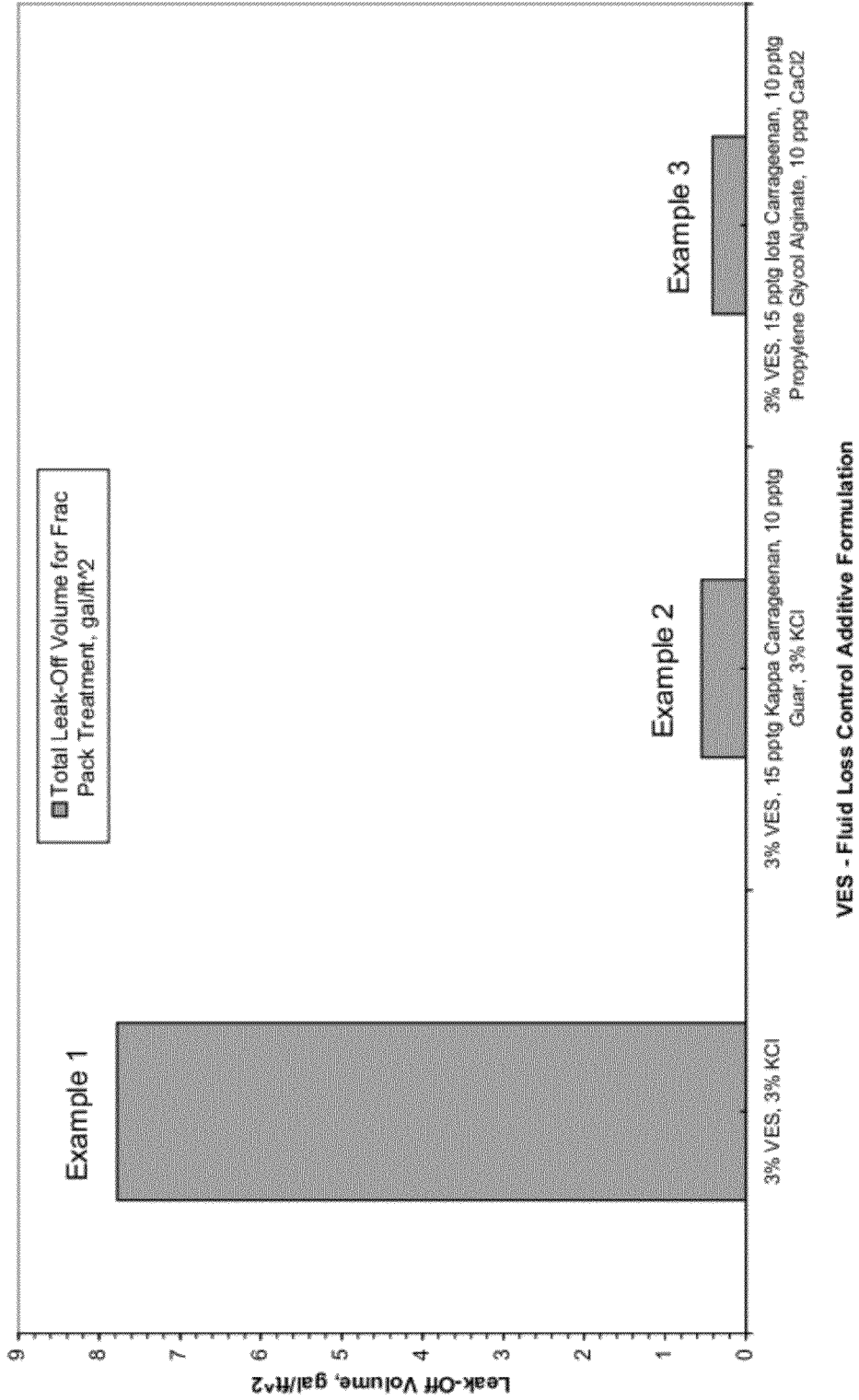

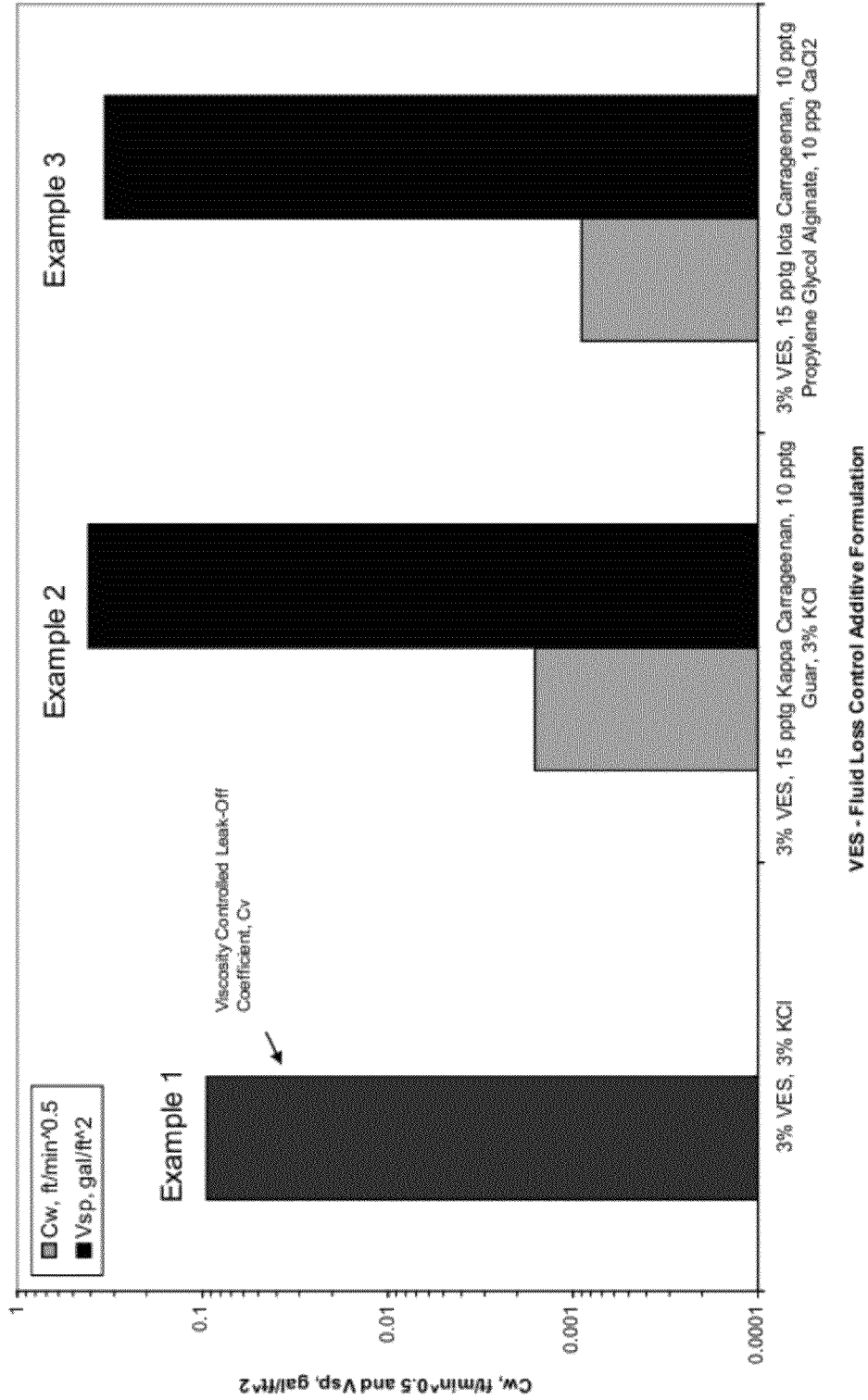

FLUID LOSS CONTROL IN VISCOELASTIC SURFACTANT FRACTURING FLUIDS USING WATER SOLUBLE POLYMERS

CROSS-REFERENCE TO RELATED APPLICATION

This application is a continuation-in-part application of U.S. patent application Ser. No. 11/863,466 filed Sep. 28, 2007, now abandoned, which in turn claims the benefit of U.S. Provisional Patent Application No. 60/848,412 filed Sep. 29, 2006, all of which are incorporated by reference herein in their entirety.

TECHNICAL FIELD

The present invention relates to aqueous, viscoelastic fluids used during hydrocarbon recovery operations, and more particularly relates, in one non-limiting embodiment, to methods and additives for controlling the fluid losses thereof.

BACKGROUND

Hydraulic fracturing is a method of using pump rate and hydraulic pressure to fracture or crack a subterranean formation. Once the crack or cracks are made, high permeability proppant, relative to the formation permeability, is pumped into the fracture to prop open the crack. When the applied pump rates and pressures are reduced or removed from the formation, the crack or fracture cannot close or heal completely because the high permeability proppant keeps the crack open. The propped crack or fracture provides a high permeability path connecting the producing wellbore to a larger formation area to enhance the production of hydrocarbons.

The development of suitable fracturing fluids is a complex art because the fluids must simultaneously meet a number of conditions. For example, they must be stable at high temperatures and/or high pump rates and shear rates which can cause the fluids to degrade and prematurely settle out the proppant before the fracturing operation is complete. Various fluids have been developed, but most commercially used fracturing fluids are aqueous based liquids which have either been gelled or foamed. When the fluids are gelled, typically a polymeric gelling agent, such as a solvatable polysaccharide is used, which may or may not be crosslinked. The thickened or gelled fluid helps keep the proppants within the fluid during the fracturing operation.

While crosslinked and uncrosslinked polymers have been used in the past as gelling agents in fracturing fluids to carry or suspend solid particles in the brine, such polymers require separate breaker compositions to be injected to reduce the viscosity.

Aqueous fluids gelled with viscoelastic surfactants (VESs) are also known in the art. VES-gelled fluids have been widely used as gravel-packing, frac-packing and fracturing fluids because they exhibit excellent rheological properties and are relatively less damaging to producing formations than fluids gelled with crosslinked polymers. VES fluids are non-cake-building fluids, and thus leave no potentially damaging polymer cake residue. VES fracturing fluids offer many properties that are conducive to a well-executed frac pack or fracturing treatment. However, these fluids have little fluid loss control. The same property that makes VES fluids relatively less damaging tends to result in significantly higher fluid leakage into the reservoir matrix, which reduces the efficiency of the fluid especially during VES fracturing treatments. Fluid lost to the formation during frac pack and hydraulic fracturing operations increases the risk of slurry dehydration and premature screen-out, increases the risk of formation damage, increases the risk of fluid incompatibilities with formation fluids (e.g. emulsions), increases the volume of fluid needed to complete the treatment, and/or can cause increased hydraulic horsepower requirements.

It would thus be very desirable and important to find and use fluid loss agents for VES fracturing treatments in high permeability formations.

SUMMARY

There is provided, in one form, a method for treating a subterranean formation that involves providing an aqueous viscoelastic treating fluid. The aqueous viscoelastic treating fluid includes, but is not limited to, an aqueous base fluid, a viscoelastic surfactant (VES) gelling agent and a fluid loss control agent (FLA). The FLA may be a water soluble uncrosslinked polymer. In one non-limiting embodiment, the aqueous viscoelastic treating fluid has an absence of a water soluble crosslinked polymer fluid loss control agent. The FLA may be present in an amount that is effective to improve the fluid loss as compared with an identical fluid absent the FLA. The aqueous viscoelastic surfactant treating fluid is injected through a wellbore and into the subterranean formation to treat it.

Additionally there is provided in another non-restrictive version, a method for treating a subterranean formation that includes injecting an aqueous viscoelastic pad fluid through a wellbore and into the subterranean formation. The pad fluid may incorporate a first aqueous base fluid and a first viscoelastic surfactant (VES) gelling agent. The method also includes injecting an aqueous viscoelastic surfactant treating fluid through a wellbore and into the subterranean formation, where the treating fluid incorporates a second aqueous base fluid and a second viscoelastic surfactant (VES) gelling agent. The first aqueous base fluid and the second aqueous base fluid may be the same or different. The first VES gelling agent and the second VES gelling agent may be the same or different. The pad fluid and/or the treating fluid contains a water soluble uncrosslinked polymer fluid loss control agent.

There is further provided in another non-limiting embodiment an aqueous viscoelastic treating fluid that includes, but is not limited to, an aqueous base fluid, a viscoelastic surfactant (VES) gelling agent, and a water soluble uncrosslinked polymer fluid loss control agent (FLA). The amount of FLA is effective to improve the fluid loss as compared with an identical fluid absent the agent.

In other non-limiting embodiments, the aqueous base fluid is a brine, and the water soluble uncrosslinked polymer fluid loss control agent may be guar gum; derivatives of guar gum including, but not necessarily limited to hydroxylpropyl guar (HPG), carboxymethyl guar (CMG), carboxymethylhydroxypropyl guar (CMHPG); derivatives of cellulose including, but not necessarily limited to hydroxyethylcellulose (HEC), carboxymethylhydroxyethylcellulose (CMHEC), propylene glycol alginate, salts (e.g. sodium and potassium salts) of alginates; salts (e.g. sodium, potassium, and calcium salts) of iota, kappa, and lambda carrageenan; agar-agar; xanthan gum; gum tragacanth; locust bean gum; karaya gum; gum arabic; starch; and/or mixtures thereof. The amount of water soluble uncrosslinked polymer fluid loss control agent may range from about 5 to about 60 pptg (about 0.6 to about 7.2 kg/m$^3$) based on the aqueous viscoelastic treating fluid.

BRIEF DESCRIPTION OF THE DRAWINGS

FIG. 1 is a chart of leak-off volume during a frac pack treatment, where the treatment time is 30 minutes, the temperature is 150° F. (66° C.), the fluid contains 3% VES, 3% KCl or 10.0 ppg (1.2 kg/l) CaCl$_2$ and the indicated fluid loss control additive; and FIG. 2 is a chart of leak-off coefficients for the VES fluids of FIG. 1.

DETAILED DESCRIPTION

Water soluble polymers have been discovered to be effective fluid loss control additives (FLAs) for VES-gelled aqueous fluids, treatments, and, procedures, particularly for hydraulic fracturing and frac pack stimulation of formations having a permeability from about 2 mD to about 2000 mD (but not necessarily limited to this range). The hydraulic fracturing fluid may be composed of an aqueous salt solution (brine) consisting of either KCl, NaCl, NaBr, KBr, CaCl$_2$, or CaBr$_2$ salt and mixtures thereof but not necessarily limited to these brines.

The water soluble polymers useful as FLAs in one non-limiting embodiment have an absence of a water soluble crosslinked polymer, alternatively the absence of a water soluble crosslinked polymer that may serve as a fluid loss control agent. In another non-restrictive version, the aqueous viscoelastic treating fluid has an absence of a nonionic polysaccharide (whether or not crosslinked), or alternatively, the water soluble uncrosslinked polymer fluid loss control agent is not a nonionic polysaccharide (whether or not crosslinked).

To viscosify the brine, VES is added to the brine in the amount of 1% to 10% by volume of solution (bvos) depending on temperature and viscosity needed. The FLAs herein may be added to the brine before the VES addition, and/or to the brine simultaneously with the VES addition and/or after the VES addition. These methods for FLA addition are what are expected to be typical.

The FLAs herein may be added to fluids in general and VES-gelled fluids in particular to decrease the amount of fluid lost to the formation during the hydraulic fracturing or frac pack or other treatment. Fluid lost to the formation increases the risk of slurry dehydration in the fracture and premature screen-out, increases the risk of formation damage, increases the risk of fluid incompatibilities such as emulsions, increases the volume of fluid needed to complete the treatment, and/or may cause increased hydraulic horsepower requirements.

The enhanced fluid loss control of the VES-water soluble polymer system may be observed as a lower fluid loss or leak-off volume calculated using the viscosity controlled leak-off coefficient (Cv), the wall-building leak-off coefficient (Cw), and the spurt loss volume (Vsp).

Formulations that have been tested include those shown in Table I.

TABLE I

Polymer FLA Tested Formulations

| Brines | % VES | % VES stabilizer* | FLA | Temp. |
|---|---|---|---|---|
| 3% KCl | 2 | — | 20-25 lbs/Mgal (2.4-3 kg/m³) | 100° F. (38° C.) |
| 9.2 ppg (1.1 kg/l) CaCl$_2$ | 3 | — | 20-25 lbs/Mgal (2.4-3 kg/m³) | 150° F. (66° C.) |
| 10 ppg (1.2 kg/l) CaCl$_2$ | 4 | 2-4 lbs/Mgal (0.2-0.5 kg/m³) | 25 lbs/Mgal (3 kg/m³) | 200° F. (93° C.) |
| 10.8 ppg (1.3 kg/l) CaCl$_2$ | 6 | 2 lbs/Mgal (0.2 kg/m³) | 30 lbs/Mgal (3.6 kg/m³) | 250° F. (121° C.) |

*stabilizer was VES-STA1 stabilizer available from Baker Oil Tools

The tests performed included apparent viscosity at temperature over time and fluid loss at the temperatures listed above. Potentially useful water soluble polymer FLAs include, but are not necessarily limited to, the polysaccharides guar and kappa carrageenan and mixtures of the two in 3% KCl. In the 9.2 ppg (1.1 kg/l) CaCl$_2$ brine, 10 ppg (1.2 kg/l) CaCl$_2$ and 10.8 ppg (1.3 kg/l) CaCl$_2$ brines the promising water soluble polymers used as FLAs included the polysaccharides propylene glycol alginate, sodium, potassium, and calcium salts of iota and kappa carrageenan and mixtures thereof.

The water soluble polymers hydroxyethylcellulose (HEC) and guar in 3% KCl brine also provided an effective FLA. HEC used with propylene glycol alginate, salts of iota carrageenan or agar-agar was also found effective at controlling fluid loss in 9.2 ppg (1.1 kg/l) CaCl$_2$, 10 ppg (1.2 kg/l) CaCl$_2$ and 10.8 ppg (1.3 kg/l) CaCl$_2$ brines.

Due to the polymeric nature of the FLAs, methods and additives to degrade the polymer to prevent damage to the formation and proppant pack would be used in one non-limiting embodiment. These methods include, but are not necessarily limited to, the use of chemicals (breakers) added to the treatment fluids described above to degrade (break) the polymer and prevent damage to the formation and proppant pack. Suitable breakers include, but are not necessarily limited to, persulfates, percarbonates, perborates, inorganic peroxides, organic peroxides, Break BAQ technology available from Baker Oil Tools (see, for instance, U.S. Pat. Nos. 6,706,769; 6,617,285 and 7,084,093 and US Patent Application Nos. 2004/0127367 A1 and 2004/0157937 A1, all incorporated by reference in their entirety herein), along with other conventional breakers similar to, but not limited to these. Suitable breaker catalysts may also be employed including, but not necessarily limited to, copper EDTA (ethylene diamine triacetic acid), copper chloride, iron chloride, iron EDTA, ethylacetocetate, diethanolamine (DEA), triethanolamine (TEA), and the like and mixtures thereof.

Various possible, non-restrictive treatment procedures to use the FLA in VES-brine solutions follow:
1. Prepare a VES solution in the supplied brine. This procedure may be done by batch mixing or continuously mixing the VES solution.
2. The VES concentration may be held constant during the hydraulic fracturing treatment or the concentration of VES may be reduced as the job progresses.
   a. For example, the pad fluid (initial fluid pumped without proppant used to create the fracture) may be mixed at 3% VES bvos while the VES fluid in the following proppant stages may also be mixed at 3% VES bvos.
   b. Another example is the pad fluid may be mixed at 3% VES bvos while the VES fluid in the following proppant stages may be mixed at less than 3% VES bvos.
3. The FLA can be added to the pad only or can be added to the pad and the VES fluid in the following proppant stages.
4. The FLA is added to the pad fluid and the fluid in the proppant stages as the fluid is continuously mixed and pumped down-hole, or if the pad fluid and the proppant laden fluid are batch mixed, the FLA is added to the batch mixer or added to the fluid as it is pumped down-hole.
5. The breakers are continuously added to the pad fluid only or throughout the entire treatment as the fluids (pad and proppant stages) are pumped down-hole.

Generally, the fluid loss control agents herein may be particularly useful in VES-gelled fluids used for well completion or stimulation. The VES-gelled fluids may further comprise proppants or gravel, if they are intended for use as fracturing fluids or gravel packing fluids, although such uses do not require that the fluids include proppants or gravel. In particular, the VES-gelled aqueous fluids containing these FLAs may have improved (reduced, diminished or prevented) fluid loss over a broad range of temperatures, such as from about 70 (about 21° C.) to about 400° F. (about 204° C.); alternatively up to about 350° F. (about 177° C.), and in another non-limiting embodiment independently up to about 300° F. (about 149° C.).

The discovery herein allows the VES system to have reduced fluid loss to help minimize formation damage during well completion or stimulation operations. That is, the introduction of these additives to the VES-gelled aqueous system will limit and reduce the amount of VES fluid which leaks-off into the pores and pore throats of a reservoir during a fracturing or frac-packing treatment, thus minimizing the formation damage that may occur by the VES fluid within the reservoir pores and pore throats. Also, limiting the amount of VES fluid that leaks-off into the reservoir during a treatment will allow more fluid to remain within the fracture and thus less total fluid volume will be required for the treatment. Having less fluid leaking-off and more fluid remaining within the fracture will enable smaller volumes of fluid to be used in generating the same fracture volume or geometry compared to a less efficient fluid. Thus the use of these additives in a VES-gelled aqueous system will improve the performance of the VES fluid while lowering fracturing treatment cost.

Additionally, it is believed that the range in reservoir permeability does not significantly control the rate of fluid leaked-off when the additives described herein are within a VES fluid. Thus, in a non-limiting example, the rate of leak-off in 2000 mD reservoirs will be comparable to rate of leak-off in 100 and 400 mD reservoirs if the FLA concentration is increased with increasing formation permeability. This enhanced control in the amount of fluid leaked-off for higher permeability reservoirs also expands the range in reservoir permeability to which the VES fluid may be applied. The expanded permeability range may allow VES fluid to be used successfully within reservoirs with permeabilities as high as 2000 to 3000 or more millidarcies (mD). Prior VES-gelled aqueous fluids have reservoir permeability limitations of about 800 mD, and even then they result in 2- to 4-fold volume of VES fluid leak-off rate as compared with the fluid loss control achievable with the methods and compositions herein.

Prior art VES-gelled aqueous fluids, being non-wall-building fluids (i.e. there is no polymer or similar material build-up on the formation face to form a filter cake) that do not build a filter cake on the formation face, have viscosity controlled fluid leak-off into the reservoir. However, some relatively smaller amounts of polymer in the VES-gelled aqueous fluids have been found to be helpful. These non-crosslinked water soluble polymers in the fluids may form true polymer mass accumulation-type filter cakes by having very high molecular weight polymers (1 to 3 million molecular weight) that due to their size are not able to penetrate the reservoir pore throats and pores, but bridge-off and restrict fluid flow in the pore throats and pores. An effective amount of the fluid loss control agent herein ranges from about 5 to about 60 pptg (about 0.6 to about 7.2 kg/m³) based on aqueous viscoelastic treating fluid. Alternatively, the lower end of this range may be about 10 pptg (1.2 kg/m³) FLA, where as the upper end of the range may independently and alternatively be about 40 pptg (4.8 kg/m³); in another non-limiting embodiment the lower end of the range may be about 15 pptg (1.8 kg/m³), where a different, independent upper end of the range is 30 pptg (3.6 kg/m³).

In the methods herein, an aqueous fracturing fluid, as a non-limiting example, may be first prepared by blending a VES into an aqueous fluid. The aqueous base fluid could be, for example, water, brine, aqueous-based foams or water-alcohol mixtures. The brine base fluid may be any brine, conventional or to be developed, which serves as a suitable media for the various concentrate components. As a matter of convenience, in many cases the brine base fluid may be the brine available at the site used in the completion fluid, for a non-limiting example. That is, typically a concentrate containing little or no water is shipped to or otherwise provided to the site of use where it is mixed with available brine or water.

The aqueous fluids gelled by the VESs herein may optionally be brines. In one non-limiting embodiment, the brines may be prepared using salts including, but not necessarily limited to, NaCl, KCl, $CaCl_2$, $MgCl_2$, $NH_4Cl$, $CaBr_2$, NaBr, KBr, sodium formate, potassium formate, and other commonly used stimulation and completion brine salts. The concentration of the salts to prepare the brines may be from about 0.5% by weight of water up to near saturation for a given salt in fresh water, such as 10%, 20%, 30% and higher percent salt by weight of water. The brine may be a combination of one or more of the mentioned salts, such as a brine prepared using NaCl and $CaCl_2$ or NaCl, $CaCl_2$, and $CaBr_2$ as non-limiting examples.

The viscoelastic surfactants suitable for use herein include, but are not necessarily limited to, non-ionic, cationic, amphoteric, and zwitterionic surfactants. Specific examples of zwitterionic/amphoteric surfactants include, but are not necessarily limited to, dihydroxyl alkyl glycinate, alkyl ampho acetate or propionate, alkyl betaine, alkyl amidopropyl betaine and alkylimino mono- or di-propionates derived from certain waxes, fats and oils. Quaternary amine surfactants are typically cationic, and the betaines are typically zwitterionic. The thickening agent may be used in conjunction with an inorganic water-soluble salt or organic additive such as phthalic acid, salicylic acid or their salts.

Some non-ionic fluids are inherently less damaging to the producing formations than cationic fluid types, and are more efficacious per pound than anionic gelling agents. Amine oxide viscoelastic surfactants have the potential to offer more gelling power per pound, making it less expensive than other fluids of this type.

The amine oxide gelling agents $RN^+(R')_2O^-$ may have the following structure (I):

where R is an alkyl or alkylamido group averaging from about 8 to 24 carbon atoms and R' are independently alkyl groups averaging from about 1 to 6 carbon atoms. In one non-limiting embodiment, R is an alkyl or alkylamido group averaging from about 8 to 16 carbon atoms and R' are independently alkyl groups averaging from about 2 to 3 carbon atoms. In an alternate, non-restrictive embodiment, the amine oxide gelling agent is tallow amido propylamine oxide (TAPAO), which should be understood as a dipropylamine oxide since both R' groups are propyl.

Materials sold under U.S. Pat. No. 5,964,295 include ClearFRAC™, which may also comprise greater than 10% of a glycol. This patent is incorporated herein in its entirety by reference. One preferred VES is an amine oxide. As noted, a particularly preferred amine oxide is tallow amido propylamine oxide (TAPAO), sold by Baker Oil Tools as WG-3L which is the VES used in SurFRAQ™ VES fluid formulations. WG-3L is a VES liquid product that is 50% TAPAO and 50% propylene glycol. These viscoelastic surfactants are capable of gelling aqueous solutions to form a gelled base fluid. The additives described herein may also be used in Diamond FRAQ™ which is a VES system, similar to SurFRAQ, which contains VES breakers sold by Baker Oil Tools.

The amount of VES included in the fracturing fluid depends on two factors. One involves generating, creating or producing enough viscosity to control the rate of fluid leak off into the pores and pore throats of the fracture, which is also dependent on the type and amount of fluid loss control agent used, and the second involves creating, generating or producing a viscosity high enough to develop the size and geometry of the fracture within the reservoir for enhanced reservoir production of hydrocarbons and to also keep the proppant particles suspended therein during the fluid injecting step, in the non-limiting case of a fracturing fluid. Thus, depending on the application, the VES is added to the aqueous fluid in concentrations ranging from about 0.5 to 12.0% by volume of the total aqueous fluid (5 to 120 gallons per thousand gallons (gptg)). In another non-limiting embodiment, the range for the compositions and methods herein ranges from about 1.0 to about 10% by volume. Alternatively, the lower threshold may be 6.0% by volume VES product. In an alternate, non-restrictive form, the amount of VES ranges from 2 independently to about 10 volume %.

In hydraulic fracturing applications, propping agents are typically added to the base fluid after the addition of the VES. Propping agents include, but are not limited to, for instance, quartz sand grains, glass and ceramic beads, bauxite grains, walnut shell fragments, aluminum pellets, nylon pellets, and the like. The propping agents are normally used in concentrations between about 1 to 14 pounds per gallon (120-1700 kg/m$^3$) of fracturing fluid composition, but higher or lower concentrations can be used as the fracture design requires. In methods where the aqueous viscoelastic treating fluid is used in a fracturing operation to place proppant in a fracture, more than a single layer of proppant is formed in the fracture. In another non-limiting embodiment where the aqueous viscoelastic treating fluid is used in a fracturing operation, the method has an absence of including a solid base-soluble material degradation agent while a proppant slurry is injected and/or an absence of including a filter cake degradation agent while a proppant or gravel slurry is injected.

The base fluid can also contain other conventional additives common to the well service industry such as water wetting surfactants, non-emulsifiers and the like. In the methods and compositions described herein, the base fluid can also contain additives which can contribute to breaking the gel (reducing the viscosity) of the VES fluid.

While the viscoelastic fluids are described most typically herein as having use in fracturing fluids, it is expected that they will find utility in completion fluids, gravel pack fluids, fluid loss pills, lost circulation pills, diverter fluids, foamed fluids, stimulation fluids and the like. For instance, fluids used in gravel packs will additionally comprise gravel; stimulation fluids may contain one or more acid or other chemically reactive compound.

In another embodiment herein, the treatment fluid may contain other viscosifying agents, other different surfactants, clay stabilization additives, scale dissolvers, biopolymer degradation additives, and other common and/or optional components.

In another non-restrictive embodiment herein, use of VES breakers may be used to degrade both the polymeric fluid loss control agent and the VES fluid. Use of the compositions herein with an internal breaker may allow less VES fluid to leak-off into the reservoir, thus resulting in less fluid needed to be broken and removed from the reservoir once the treatment is over. Additionally, use of an internal breaker within the VES micelles may further enhance the breaking and removal of the filter cake-viscous VES layer that develops on the formation face with the fluid loss agents discussed herein. In the methods and fluids described herein, it may be necessary to use two different breakers. A breaker for the VES-gelled portions of the fluid may convert or change the wormlike or elongated micelles into more spherically-shaped micelles to reduce the viscosity. A separate or different breaker may be used to reduce any viscosity created by the water soluble non-crosslinked polysaccharides, as well as true filter cakes formed thereby. It may be possible, in some limited cases for the same breaker or breaking mechanism to be used for both VES-created viscosity and polymer-created viscosity. In another non-limiting embodiment one or more of the breakers may be encapsulated to delay its activity.

The proppant, solid particle or gravel may be any solid particulate matter suitable for its intended purpose, for example as a screen or proppant, etc. Suitable materials include, but are not necessarily limited to sand, sintered bauxite, sized calcium carbonate, other sized salts, ceramic beads, and the like, and combinations thereof. These solids may also be used in a fluid loss control application.

The invention will be further described with respect to the following Examples which are not meant to limit the invention, but rather to further illustrate the various embodiments.

Examples 1-3

Besides the data presented above, the fluids described in Table II were tested.

TABLE II

| Component | Ex. 1 | Ex. 2 | Ex. 3 |
|---|---|---|---|
| | | Formations of Examples 1-3 | |
| VES | 3% TAPAO | 3% TAPAO | 3% TAPAO |
| Brine salt | 3% KCl | 3% KCl | 10 ppg (1.2 kg/l) CaCl$_2$ |
| FLA | — | 15 pptg (1.8 kg/m$^3$) kappa carrageenan 10 pptg (1.2 kg/m$^3$) guar | 15 pptg (1.8 kg/m$^3$) iota carrageenan 10 pptg (1.2 kg/m$^3$) propylene glycol alginate |

FIG. 1 is a chart presenting the results of leak-off tests for each of the three fluids for a 30 minute treatment time at 150° F. (66° C.). It may be seen that the fluids of Examples 2 and 3 gave much lower volumes of fluid leak-off than the control fluid of Example 1 containing no uncrosslinked polymer FLA.

FIG. 2 is a chart presenting the results of leak-off coefficients for the three fluids of Table II. The wall building leak-off coefficients (Cw) of the fluids of inventive Examples 2 and 3 were much lower than the controlled leak-off coefficient (Cv) of control Example 1 fluid. Vsp is the initial influx of fluid into the formation as virgin fracture face is exposed during the frac pack treatment and before the polymer FLA acts to slow fluid loss. The lower the Vsp, the lower will be the fluid lost to the formation. Since Vsp occurs in a very short amount of time, Cv and Cw are the major contributors to fluid loss.

Adding the FLAs herein to the brine before the VES addition has also been tested and found to be effective.

In the foregoing specification, the invention has been described with reference to specific embodiments thereof, and has been demonstrated as effective in inhibiting fluid loss for viscoelastic surfactant gelled fluids. However, it will be evident that various modifications and changes can be made thereto without departing from the broader spirit or scope of the invention as set forth in the appended claims. Accordingly, the specification is to be regarded in an illustrative rather than a restrictive sense. For example, specific combinations of brines, viscoelastic surfactants, water-soluble uncrosslinked polymers and other components falling within the claimed parameters, but not specifically identified or tried in a particular composition, are anticipated to be within the scope of this invention.

The word "comprising" as used throughout the claims is to be interpreted to mean "including but not limited to".

The present invention may suitably comprise, consist or consist essentially of the elements disclosed and may be practiced in the absence of an element not disclosed. For instance, the aqueous viscoelastic surfactant treating fluid may also consist of or consist essentially of an aqueous base fluid, a viscoelastic surfactant (VES) gelling agent, and a water soluble uncrosslinked polymer fluid loss control agent. Alternatively, aqueous viscoelastic surfactant treating fluid has an absence of a water soluble crosslinked polymer fluid loss control agent.

What is claimed is:

1. A method for treating a subterranean formation comprising:
   injecting an aqueous viscoelastic surfactant treating fluid through a wellbore and into the subterranean formation, where the aqueous viscoelastic treating fluid consists of:
   an aqueous base fluid;
   a viscoelastic surfactant (VES) gelling agent; and
   a water soluble uncrosslinked polymer fluid loss control agent; and
   optionally a component selected from the group consisting of a proppant, gravel, an acid, a salt, other surfactants different from the VES, clay stabilization additives, scale dissolvers, biopolymer degradation additives, and combinations thereof;
   where the aqueous viscoelastic treating fluid has an absence of a water soluble crosslinked polymer fluid loss control agent; and
   treating the subterranean formation.

2. The method of claim 1 where the uncrosslinked polymer fluid loss control agent is selected from the group of polysaccharides consisting of guar gum; hydroxylpropyl guar (HPG); carboxymethyl guar (CMG); carboxymethylhydroxypropyl guar (CMHPG); hydroxyethylcellulose (HEC); carboxymethylhydroxyethylcellulose (CMHEC); propylene glycol alginate; salts of alginates; salts of iota, kappa, and lambda carrageenan; agar-agar; xanthan gum; gum tragacanth; locust bean gum; karaya gum; gum arabic; starch; and mixtures thereof.

3. The method of claim 1 where the effective amount of the fluid loss control agent ranges from about 5 to about 60 pptg (about 0.6 to about 7.2 kg/m$^3$) based on aqueous viscoelastic treating fluid.

4. The method of claim 1 where the fluid loss control agent is added to the aqueous viscoelastic treating fluid before, during, and/or after the VES gelling agent is added.

5. The method of claim 1 where treating the subterranean formation is selected from the group consisting of:
   fracturing the formation under effective pressure where the aqueous viscoelastic treating fluid further comprises a proppant;
   placing proppant in a fracture;
   packing the wellbore between a screen and formation with gravel where the aqueous viscoelastic treating fluid further comprises gravel;
   stimulating the formation where the aqueous viscoelastic treating fluid further comprises a stimulating agent;
   completing a well; and
   controlling fluid loss where the aqueous viscoelastic treating fluid further comprises a salt or easily removed solid; and combinations thereof.

6. The method of claim 1 where the amount of water soluble uncrosslinked polymer fluid loss control agent is effective to improve the fluid loss as compared with an identical fluid absent the agent.

7. A method for treating a subterranean formation comprising:
   injecting an aqueous viscoelastic surfactant treating fluid through a wellbore and into the subterranean formation, where the aqueous viscoelastic treating fluid consists of:
   an aqueous brine base fluid;
   a viscoelastic surfactant (VES) gelling agent; and
   from about 5 to about 60 pptg (about 0.6 to about 7.2 kg/m$^3$) based on the aqueous viscoelastic treating fluid of a water soluble uncrosslinked polymer fluid loss control agent selected from the group of polysaccharides consisting of guar gum; hydroxylpropyl guar (HPG); carboxymethyl guar (CMG); carboxymethylhydroxypropyl guar (CMHPG); hydroxyethylcellulose (HEC); carboxymethylhydroxyethylcellulose (CMHEC); propylene glycol alginate; salts of alginates; salts of iota, kappa, and lambda carrageenan; agar-agar; xanthan gum; gum tragacanth; locust bean gum; karaya gum; gum arabic; starch; and mixtures thereof; and
   optionally a component selected from the group consisting of a proppant, gravel, an acid, a salt, other surfactants different from the VES, clay stabilization additives, scale dissolvers, biopolymer degradation additives, and combinations thereof;
   in the absence of a water soluble crosslinked polymer fluid loss control agent; and
   treating the subterranean formation.

8. A method for treating a subterranean formation comprising:
   injecting an aqueous viscoelastic pad fluid through a wellbore and into the subterranean formation, the pad fluid consisting of:
   a first aqueous base fluid; and
   a first viscoelastic surfactant (VES) gelling agent; and
   injecting an aqueous viscoelastic surfactant treating fluid through a wellbore and into the subterranean formation, the treating fluid consisting of:
   a second aqueous base fluid; and
   a second viscoelastic surfactant (VES) gelling agent;
   where the first aqueous base fluid and the second aqueous base fluid may be the same or different;
   where the first VES gelling agent and the second VES gelling agent may be the same or different; and
   where at least one of the fluids selected from the group consisting of the pad fluid and the treating fluid additionally consists of a water soluble uncrosslinked polymer fluid loss control agent in the absence of a water soluble crosslinked polymer fluid loss control agent, and optionally a component selected from the group consisting of a proppant, gravel, an acid, a salt, other surfactants different from the VES, clay stabilization additives, scale dissolvers, biopolymer degradation additives, and combinations thereof.

9. The method of claim 8 where the amount of VES gelling agent in the treating fluid is less than the amount of VES gelling agent in the pad fluid.

10. The method of claim 8 where the amount of water soluble uncrosslinked polymer fluid loss control agent is effective to improve the fluid loss as compared with an identical fluid absent the agent.

* * * * *